United States Patent [19]

Saito et al.

[11] Patent Number: 4,578,427

[45] Date of Patent: Mar. 25, 1986

[54] COATING RESIN COMPOSITION

[75] Inventors: Teruo Saito, Shiga; Kuniaki Asai, Osaka; Kazuo Hieda, Hyogo, all of Japan

[73] Assignee: Sumitomo Chemical Company, Limited, Osaka, Japan

[21] Appl. No.: 694,366

[22] Filed: Jan. 24, 1985

[30] Foreign Application Priority Data

Jan. 24, 1984 [JP] Japan .................................. 59-11484

[51] Int. Cl.$^4$ ...................... C08L 27/18; C08L 27/20; C08L 61/00
[52] U.S. Cl. .................................... 525/150; 525/151; 525/153
[58] Field of Search ....................... 525/151, 153, 150; 526/247, 254

[56] References Cited

U.S. PATENT DOCUMENTS 4,001,351 1/1977 Roura .................................. 526/254
4,351,882 9/1982 Concannon ......................... 428/422

OTHER PUBLICATIONS

"Research Disclosure", 3/81; pp. 112–113, 20308, Coating Compositions & Coated Articles.

Primary Examiner—Jacob Ziegler
Attorney, Agent, or Firm—Sughrue, Mion, Zinn, Macpeak and Seas

[57] ABSTRACT

A coating resin composition is described, comprising from 50 to 99% by weight of a thermoplastic aromatic polyether ketone resin and from 50 to 1% by weight of a perfluoroalkoxy resin or a tetrafluoroethylene/hexafluoropropylene copolymer resin having hexafluoropropylene content of from 18 to 25% by weight. The composition, when applied to a steel plate, for example, produces a coating film which is greatly improved in water repellency while retaining the desirable properties of the polyether ketone, such as high heat resistance, good mechanical and electrical properties, and high chemical resistance.

7 Claims, No Drawings

COATING RESIN COMPOSITION

FIELD OF THE INVENTION

The present invention relates to a coating resin composition comprising a thermoplastic aromatic polyether ketone resin and a perfluoroalkoxy resin or a tetrafluoroethylene/hexafluoropropylene copolymer resin and particularly, to a coating resin composition from which a coating film which has good appearance, is free from pinholes and is good in water repellency and adhesion to a substrate can be obtained.

BACKGROUND OF THE INVENTION

It is known, as described in Japanese Patent Application (OPI) No. 90296/79 (the term "OPI" as used herein means a "published unexamined Japanese patent application"), that thermoplastic aromatic polyether ketone resins are superior in heat resistance, flame resistance, mechanical and electrical properties, and chemical resistance. Because of these superior properties, it has been suggested to utilize the resin particularly in electrically insulating coating of electrical wires and cables. But the use of the resin is not limited to the coating of electrical wires or cables. That is, a further development is expected in various industries in the electrical or mechanical field by expanding its range for use by means of imparting electrically insulative coating, anti-corrosion property, etc. to various electrically conductive materials.

In order to impart excellent properties of such thermoplastic aromatic polyether ketone resins such as electrical insulation and anti-corrosion properties to metal substrates, especially steel, aluminum and copper, extensive investigations on the coating of the thermoplastic aromatic polyether ketone resin have been made by the present inventors. As the results, there were previously proposed the following procedures for forming a good coating film: a method in which a polyether ketone having a specific particle diameter is applied onto the surface of a substrate, melted at a specific temperature, and then cooled to form a strong coating film (see Japanese Patent Application (OPI) Nos. 127768/83 and 130574/84; and a method in which a molten polyether ketone is fused onto the surface of a substrate and then cooled to form a strong coating film (see Japanese Patent Application No. 83289/83).

The polyether ketone coating films obtained by the above methods retain the superior properties of the polyether ketone resin, i.e., high heat resistance, flame resistance, mechanical and electrical properties, chemical resistance, and resistance to boiling water, and further can impart high electrical insulation, corrosion resistance, and resistance to boiling water to the metal substrate, whereby they are proceeding development of useful products and are contributing to development of the industry.

The polyether ketone resin does not undergo chemical deterioration even when exposed to boiling water or steam of more than 200° C. Because of such superior resistance to boiling water and resistance to steam, the polyether ketone resin is expected to be used in various fields, e.g., nuclear power field, oil drilling field, etc. as well as various chemical equipments. The polyether ketone resin, however, is poor in water repellancy (a property to repel water). When it is, for example, applied to a level gage of boiling water, there are caused various problems such as an error in the detection of the boiling water dip surface and easy occurrence of scale. Thus it has been strongly desired to improve the water repellency in many applications using boiling water.

As a result of extensive investigations, it has been found that a composition as described below can produce a coating film which is improved in water repellency without deteriorating the superior properties of the polyether ketone resin, such as resistance to boiling water and resistance to steam, exhibits good adhesion to a substrate, has good appearance, and further is free from pinholes, leading to accomplishment of the present invention.

SUMMARY OF THE INVENTION

An object of the present invention is to provide a coating resin composition comprising from 50 to 99% by weight of a thermoplastic aromatic polyether ketone resin and from 50 to 1% by weight of perfluoroalkoxy resin or a tetrafluoroethylene/hexafluoropropylene copolymer resin having hexafluoropropylene content of from 18 to 25% by weight.

DETAILED DESCRIPTION OF THE INVENTION

The thermoplastic aromatic polyether ketone resin as used herein contains the following repeating unit:

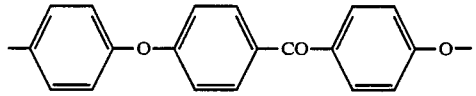

singly or in combination with other repeating units, and has an inherent viscosity of from 0.3 to 2.6, preferably from 0.5 to 1.8. Examples of these other repeating units are shown below:

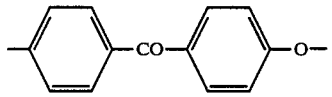

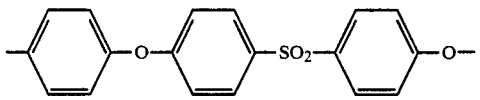

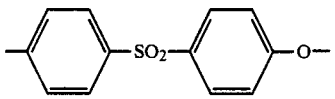

The proportion of the other repeating units is usually less than 25% by weight. If it exceeds 25% by weight, the above described characteristics of the polyether ketone are undesirably lost. The inherent viscosity as referred to herein is determined with respect to a solution of a polymer sample in concentrated sulfuric acid (density: 1.84 g/cm$^3$), containing 0.1 g of the polymer sample per 100 cm$^3$ of the solution, at 25° C.

The inherent viscosity was determined by the use of a viscometer having a solvent efflux time of about 2 minutes. This inherent viscosity principally corresponds to the molecular weight of the polymer.

The inherent viscosity of the thermoplastic aromatic polyether ketone is from 0.3 to 2.6 and preferably from 0.5 to 1.8. If the inherent viscosity is less than 0.3, the ultimate coating film is low in heat resistance and brittle because of its low molecular weight. On the other hand, if exceeds 2.6, the resulting resin composition is not satisfactory in melt fluidity because of its high melt viscosity and therefore, a coating film having a uniform thickness is difficult to produce; no satisfactory coating film can be obtained. When the inherent viscosity is between 0.3 and 2.6, good fluidity and satisfactory coating film performance can be obtained. In order to obtain a coating film having more improved surface appearance, adhesion strength and toughness, it is preferred for the inherent viscosity to be in the range of from 0.5 to 1.8. When the inherent viscosity is within the range of from 0.3 to 2.6, a melting point as measured by a differential calorimeter is from 330° to 335° C. and good heat stability and thermoplasticity can be obtained.

The perfluoroalkoxy resin (hereinafter abbreviated to "PFA") as used herein is represented by the following general formula:

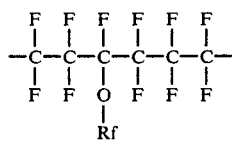

wherein Rf is a fluoroalkyl group, and —O—Rf is a perfluoroalkoxy group. PFA has a melting point of from 302° to 310° C., exhibits melt fluidity at temperatures more than the melting point thereof, has high heat resistance and chemical resistance, has a continuous service temperature of 260° C., and is little affected by the usual acids, alkalis, oxidation-reduction agents, halogens, and organic solvents.

PFA is sold under the trade name of Teflon PFA by E. I. Du Pont de Nemours & Co., Inc., U.S.A. and Mitsui Fluorochemicals Co., Ltd., Japan.

The tetrafluoroethylene/hexafluoropropylene copolymer (hereinafter abbreviated to "FEP") is represented by the following general formula:

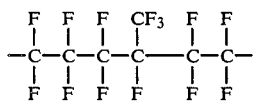

FEP has a melting point of from 250° to 290° C., exhibits melt fluidity at temperatures more than the melting point thereof, has high heat resistance and chemical resistance, and has a continuous service temperature of 200° C.

FEP is commercially available from E. I. Du Pont de Nemours & Co., Inc., U.S.A. (trade name: Teflon FEP) and Daikin Kogyo Co., Ltd. (trade name: Neofuron). Among commercially available FEPs, those copolymers having a hexafluoropropylene content of from 18 to 25% by weight are preferably used in the present invention because their physical properties and melt fluidity are well balanced.

If the hexafluoropropylene content is less than 18% by weight, FEP is not satisfactory in melt fluidity and when the composition with a polyether ketone is applied on a substrate, the coating film applied is seriously large in irregularity and has pinholes; it fails to impart corrosion resistance to the substrate. On the other hand, if the hexafluoropropylene content exceeds 25% by weight, since the melting point serious drops, when the composition with a polyether ketone is applied on a substrate, a reduction in heat resistance is undesirably large.

In compounding the polyether ketone with PFA or FEP, it is preferred that the proportion of the polyether ketone is from 50 to 99% by weight, with that of PFA or FEP being from 50 to 1% by weight, based on the total amount of the polyether ketone and PFA or FEP. If the proportion of the polyether ketone exceeds 99% by weight, i.e., the proportion of PFA or FEP is less than 1% by weight, the desired water repellency can be improved only insufficiently. On the other hand, if the proportion of the polyether ketone is less than 50% by weight and the proportion of PFA or FEP exceeds 50% by weight, insufficient dispersion results and furthermore, the adhesion to the substrate is insufficient. Thus a satisfactory coating film cannot be obtained.

With a composition comprising from 50 to 99% by weight of the polyether ketone and from 50 to 1% by weight of PFA or FEP, a coating film which is satisfactory in heat resistance, resistance to boiling water, water repellency, adhesion to a substrate, and appearance and is free from pinholes can be obtained. A composition comprising from 60 to 97% by weight of the polyether ketone and from 40 to 3% by weight of PFA or FEP is preferred, because a coating film which is more improved in the above properties can be obtained.

Even when the proportion of the polyether ketone falls within the range of from 50 to 99% by weight, if fluorocarbon resins other than PFA and FEP are employed, the desired coating film cannot be obtained.

That is, when polytetrafluoroethylene is, for example, concerned though it has a melting point of about 330° C., it does not exhibit melt fluidity even at temperatures above the melting point thereof and hence, the resulting composition with a polyether ketone can form only a coating film on a substrate which is very irregular in the surface and does not have uniform surface appearance because of it poor dispersibility. Furthermore, pinholes are developed in the coating film because of poor fluidity. Thus it falls to impart corrosion resistance to a substrate.

On the other hand, when fluorocarbon resins other than PFA and FEP, exhibiting melt fluidity, such as polychlorotrifluoroethylene, polyvinyl fluoride, polyvinylidene fluoride, an ethylene/tetrafluoroethylene copolymer, and ethylene/chlorotrifluoroethylene copolymer, are used, water repellency is not satisfactory so that the desired coating cannot be obtained.

The composition of the present invention is not limited in the means of compounding the constituents; the polyether ketone and PFA or FEP can be compounded by any suitable technique such as a method in which powders of the polyether ketone and PFA or FEP are mixed by the use of, e.g., a mortar, a Henschel mixer, a ball mill, and a ribbon blender, a method in which the mixture is melt-kneaded to improve dispersibility, followed by granulating or powdering by grinding, and a method in which powders of the polyether ketone and PFA or FEP are independently deposited on the surface of a substrate and then mixed on the substrate.

In forming a coating film from the composition on the substrate, any suitable technique can be employed, including powder coating methods such as powder spraying, electrostatic coating, and fluidized bed coating, compression molding, extrusion molding, and injection molding. Depending on the coating method, the composition of the present invention is applied in the form of powders, granules, or sheets.

To the composition of the present invention can be added within the ranges that do not deteriorate the desired characteristics, usual additives such as an antioxidant, a heat stabilizer, an ultraviolet absorber, a lubricant, a releasing agent, a coloring agent (e.g., a dye and a pigment), a flame retardant, an auxiliary flame retardant, and an antistatic agent, or suitable reinforcing agents and fillers. These additives can be used alone or in combination of two or more thereof.

The present inventin is described in greater detail with reference to the following examples, although it is not intended to be limited thereto.

EXAMPLES 1 TO 3

A powdered thermoplastic aromatic polyetherketone resin having a repeating unit represented by:

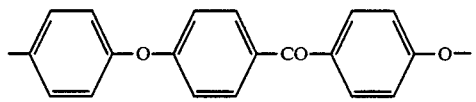

having an inherent viscosity of 0.8, an average particle diameter of 100 microns and a perfluoroalkoxy resin (Teflon PFA MP-10, a product of Mitsui Fluorochemicals Co., Ltd.; average particle diameter: 39 microns) were powder blended in a Henschel mixer in a proportion as shown in Table 1.

The mixture of polyether ketone and perfluoroalkoxy resin was spray coated in a powder-jetting amount of 300 g/min at a voltage of 60 KV by the use of an electrostatic spray apparatus (Model CH-9015, manufactured by GEMA Corp.) on a surface of a steel plate (JIS S45C) which had been sand-blasted so that the average depth of irregularities was 5 to 10 microns and an interval between irregularities was 10 to 20 microns, and then melt baked by heating at 380° C. for 20 minutes. Thereafter, the resulting steel plate was taken out of the heating furnace and allowed to cool to room temperature in air.

The thus-formed coating film was tested for the surface condition, pinholes, adhesion strength, heat resistance, and water repellency. The results are shown in Table 1.

The pinhole test was performed with a discharge-type pinhole tester (Model TRC-20, manufactured by Sanko Denshi Kenkyujo).

The adhesion strength was evaluated in terms of peeling strength as determined by a 180° C. coating film-peeling test (peeling speed: 50 mm/min), and the resistance to boiling water, in terms of peeling strength after soaking in 200° C. boiling water for 100 hours.

The water repellency was evaluated in terms of contact angle of a water droplet gently dropped on the surface of the coating film. The greater the contact angle, the better the water repellency.

COMPARATIVE EXAMPLE 1

The same procedure as in Example 1 was repeated except that the perfluoroalkoxy resin was not compounded and only the powdered polyether ketone resin was used. The results are shown in Table 1.

COMPARATIVE EXAMPLE 2

The same procedure as in Example 1 was repeated except that the amounts of the polyether ketone and the perfluoroalkoxy resin compound were changed to 40% by weight and 60% by weight, respectively. The results are shown in Table 1.

EXAMPLE 4

The same procedure as in Example 1 was repeated except that a tetrafluoroethylene/hexafluoropropylene copolymer resin (FEP powder having a hexafluoropropylene content of 20%) was used in place of the perfluoroalkoxy resin and that a mixture comprising 80% by weight of the polyether ketone and 20% by weight of FEP was used. The results are shown in Table 1.

COMPARATIVE EXAMPLE 3

The same procedure as in Example 4 was repeated except that the amounts of the polyether ketone and the tetrafluoroethylene/hexafluoropropylene copolymer resin compounded were changed to 40% by weight and 60% by weight, respectively. The results are shown in Table 1.

COMPARATIVE EXAMPLE 4

The same procedure as in Example 4 was repeated except that polyvinylidene fluoride (KF polymer powder, manufactured by Kureha Chemical Industry Co., Ltd.; abbreviated as "PVdF") was used in place of the tetrafluoroethylene/hexafluoropropylene copolymer resin. The results are shown in Table 1.

COMPARATIVE EXAMPLE 5

The same procedure as in Example 4 was repeated except that polytetrafluoroethylene (Fluon L169 powder, manufactured by Imperial Chemical Industries PLC; abbreviated as "PTFE") was used in place of the tetrafluoroethylene/hexafluoropropylene copolymer resin. The results are shown in Table 1.

TABLE 1

| | Composition (wt %) | | | | Peeling Strength (kg/cm) | | Contact Angle (°) |
| | Polyether Ketone | Fluorine-Based Resin | Appearance | Pinhole | Before Soaking | After Soaking in 200° C. Boiling Water for 100 Hrs | |
| --- | --- | --- | --- | --- | --- | --- | --- |
| Example 1 | 95 | PFA 5 | Good | None | 4.3 | 3.8 | 78 |
| Example 2 | 80 | PFA 20 | " | " | 4.0 | 3.6 | 90 |
| Example 3 | 70 | PFA 30 | " | " | 3.8 | 3.4 | 93 |
| Comparative Example 1 | 100 | PFA 0 | " | " | 4.8 | 4.0 | 65 |
| Comparative Example 2 | 40 | PFA 60 | Poor dispersion | " | 1.5 | 0 | 100 |
| Example 4 | 80 | FEP 20 | Good | " | 3.8 | 3.4 | 88 |
| Comparative Example 3 | 40 | FEP 60 | Poor dispersion | " | 1.3 | 0 | 96 |

TABLE 1-continued

| | Composition (wt %) | | | | Peeling Strength (kg/cm) | | |
| | Polyether Ketone | Fluorine-Based Resin | Appearance | Pinhole | Before Soaking | After Soaking in 200° C. Boiling Water for 100 Hrs | Contact Angle (°) |
|---|---|---|---|---|---|---|---|
| Comparative Example 4 | 80 | PVdF 20 | Seriously colored | " | 3.4 | 2.8 | 68 |
| Comparative Example 5 | 80 | PTFE 20 | Big irregularities | Many pinholes | 2.8 | 2.4 | 88 |

As is apparent from Table 1, the coating films produced using the compositions of Examples 1 to 4 have good appearance, are free from pinholes, and are good in adhesion to a substrate and resistance to boiling water. In addition, it can be seen that the contact angle is large and the water repellency is excellent.

When the polyether ketone is used singly, the water repellency is poor (Comparative Example 1); when the amounts of PFA and FEP compounded are too large, the dispersibility is low and the adhesion to a substrate is poor (Comparative Examples 2 and 3); and when a fluorocarbon resin other than PFA and FEP is used, the water repellency is poor (Comparative Example 4), or many pinholes are formed (Comparative Example 5); a satisfactory coating film cannot be obtained.

While the invention has been described in detail and with reference to specific embodiments thereof, it will be apparent to one skilled in the art that various changes and modifications can be made therein without departing from the spirit and scope thereof.

What is claimed is:

1. A coating resin composition comprising from 50 to 99% by weight of a thermoplastic aromatic polyether ketone resin and from 50 to 1% by weight of perfluoroalkoxy resin or a tetrafluoroethylene/hexafluoropropylene compolymer having a hexafluoropropylene content of from 18 to 25% by weight.

2. A coating resin composition as claimed in claim 1, wherein said thermoplastic aromatic polyether ketone contains the following repeating unit:

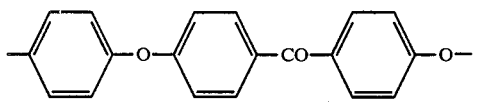

3. A coating resin composition as claimed in claim 2, wherein said thermoplastic aromatic polyether ketone further contains less than 25% by weight of a repeating unit represented by the following formulae:

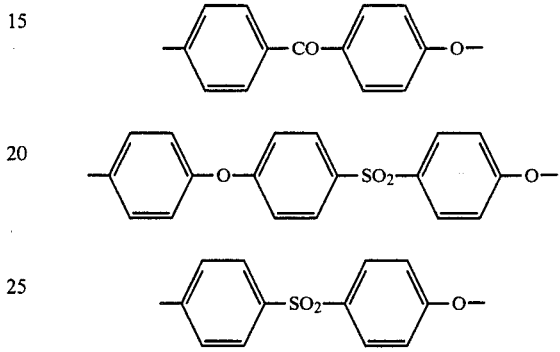

4. A coating resin composition as claimed in claim 1, wherein said thermoplastic aromatic polyether ketone has an intrinsic viscosity of from 0.3 to 2.6.

5. A coating resin composition as claimed in claim 1, wherein said perfluoroalkoxy resin is represented by the following formula:

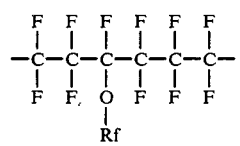

wherein Rf is a fluoroalkyl group, and —O—Rf is a perfluoroalkoxy group, and has a melting point of from 302° to 310° C.

6. A coating resin composition as claimed in claim 1, wherein said tetrafluoroethylene/hexafluoropropylene copolymer is represented by the following general formula:

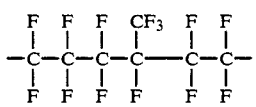

and has a melting point of from 250° to 290° C.

7. A coating resin composition as claimed in claim 1, comprising from 60 to 97% by weight of said thermoplastic aromatic polyether ketone resin and from 40 to 3% by weight of said perfluoroalkoxy resin or tetrafluoroethylene/hexafluoropropylene copolymer.

* * * * *